Patented Aug. 18, 1953

2,649,484

UNITED STATES PATENT OFFICE 2,649,484

TRIALKYL HYDROXYLAMINE-SULFUR TRIOXIDE COMPOUNDS

William B. Hardy, Bound Brook, N. J., assignor to American Cyanamid Company, New York, N. Y., a corporation of Maine No Drawing. Application January 17, 1951, Serial No. 206,515

4 Claims. (Cl. 260—584)

This invention relates to new chemical compounds which are sulfur trioxide addition products of trialkyl hydroxylamines, and to the use of these compounds in the preparation of sulfuric half-esters of leuco vat dyes.

In the past the preparation of sulfuric half-esters of leuco vat dyes has been effected with sulfur trioxide addition products of tertiary amines. The original processes required operating under anhydrous conditions. More modern and improved processes were developed in which the sulfur trioxide addition products of strongly basic tertiary amines, such as trialkyl amines, which processes could be carried out in an aqueous medium. Addition products of weaker bases, such as pyridine, were not useful in the aqueous process as they decomposed under the alkaline conditions and did not give satisfactory yields.

Although trialkyl hydroxylamines are known to be very weak bases, it was found, surprisingly, that they not only formed well-defined addition products with sulfur trioxide but, and this is even more surprising, these addition products are sufficiently stable so that they can be used for production of sulfuric acid half-esters in processes operating in an aqueous medium. The anomalous behavior of the sulfur trioxide addition products of trialkyl hydroxylamines has not as yet been explained and it is not intended to limit the present invention to any theory of why the sulfur trioxide addition compounds of these very weak bases can be made at all, much less why they show the unexpected stability in aqueous esterification processes which hitherto was possessed only by the sulfur trioxide addition products of strong bases.

Although the preferred embodiments of the present invention so far as the esterification processes are concerned are those which use an aqueous medium, the invention is of course not limited thereto, for the sulfur trioxide addition products can also be used in the less convenient and older anhydrous esterification processes.

The present invention includes generally the sulfur trioxide addition products of lower trialkyl hydroxylamines free of reactive substituents, such as O,N,N-trimethylhydroxylamine, O,N-diethyl-N-methylhydroxylamine, O-methyl-N-di(beta-chloroethyl) hydroxylamine, O-butyl-N, N - dimethylhydroxylamine, propyldimethylhydroxylamine, and the like. The latter compounds have not heretofore been reported, but can be prepared as will be further described, by the alkylation of dimethylhydroxylamine or the hydrogenation of tri-substituted hydroxylamines containing an olefinic linkage.

The various members of the series, however, have slightly differing properties, some being more useful for esterification in aqueous medium than in anhydrous medium and others being quite suitable for use in the old anhydrous esterification process.

The preparation of the sulfur trioxide addition products does not present any great operating difficulties. In general, the reaction procedures which have been used in the preparation of other sulfur trioxide addition products can be employed; thus the addition products may be obtained by reaction with sulfur trioxide or with chlorosulfonic acid. They can be isolated in crystalline form, or used directly in situ for the esterification reaction, which can also be carried out by known methods in an aqueous solution of the vat, or by reducing the dye with metal in an organic solvent and then treating with the trialkyl hydroxylamine sulfur trioxide compound. The product can be isolated in the ordinary way, for example, by salting out of solution after distillation to remove the liberated trialkyl hydroxylamine and any organic solvents. Alternatively, if it is not desired to isolate the product in solid form, the solution obtained can be directly converted to printing paste. It is an advantage of the present invention that the operative procedures are similar to those which have been used in preparing other addition products in the past and that no new operating techniques are required.

The invention will be described in detail in the following specific examples, the parts being by weight unless otherwise specified.

Example 1

A solution of 29 parts of N,N-dimethylhydroxylamine and 43 parts of butyl iodide in 78 parts of ether is allowed to stand at room temperature until the reaction is complete. The ether solution is then filtered and treated with potassium carbonate and phenyl isocyanate to react with any unchanged starting material. The ether solution is again filtered and then saturated with dry hydrogen chloride at 10° C. The white crystalline hydrochloride of O-butyl-N,N-dimethylhydroxylamine is filtered and washed with cold ether. For conversion to the free base, 18 parts of this product are treated with about 45 parts of 5 N sodium hydroxide. The upper layer is separated, dried over potassium hydroxide, and distilled to give a colorless liquid boiling at 110 to 112° C.

Example 2

A solution of 38.4 parts of O-allyl-N,N-dimethylhyroxylamine in 135 parts of 6% aqueous alcohol is treated with palladium on charcoal catalyst and hydrogenated at 40 pounds pressure. Reaction is rapidly complete, and is followed by the addition of 55 parts of concentrated hydrochloric acid and evaporation to dryness. The solid is treated with 120 parts of 5 N sodium hydroxide. The layer of O-propyl-N,N-dimethylhydroxylamine is separated, dried over potassium hydroxide pellets, and distilled at 80.5 to 82° C.

Example 3

A solution of 7.1 parts of O,N,N-trimethylhydroxylamine in 141 parts of dry ethylene chloride, which may be prepared by heating the hydrochloride of the base with alkali and collecting the product in ethylene chloride, is cooled to 20° C. and gradually treated with 7.7 parts of sulfur trioxide. The resulting white crystalline solid is filtered and washed with a little cold ethylene chloride. It is obtained in excellent yield and melts around 123 to 126° C.

Example 4

A solution of 5.3 parts of O-propyl-N,N-dimethylhydroxylamine in 58 parts of dry ethylene chloride is treated gradually with 5.5 parts of liquid sulfur trioxide at a temperature of 20° to 23° C., as described above. The mixture remains clear throughout. The ethylene chloride is then removed by evaporation. The resulting liquid product is used directly for esterification as described below.

Example 5

A solution of 7.3 parts of O-butyl-N,N-dimethylhydroxylamine in 100 parts of dry ethylene chloride is cooled to 20° and treated at this temperature with 4.9 parts of liquid sulfur trioxide. Reaction is accompanied by a sharp rise in temperature. The ethylene chloride is removed by evaporation, leaving the product ready for use in esterifications as described.

Example 6

An aqueous paste of 210 parts of 3,4,8,9-dibenzopyrene quinone, containing 33 parts of real dyestuff, is stirred under a nitrogen atmosphere with 95 parts of 5 N sodium hydroxide and 25 parts of sodium hydrosulfite. Vatting is completed at 50° C. The mixture is cooled to 10° and treated with 42 parts of sodium carbonate followed by 50 parts of the sulfur trioxide compound of trimethylhydroxylamine. After a short period of stirring, this is followed by the gradual further addition of 55 parts of 5 N sodium hydroxide. The reaction mixture is gradually brought to 25° and then heated to 60° to remove liberated trimethylhydroxylamine. The slurry is aerated, heated, and clarified by filtration. The filtrate is salted with sodium chloride to give a bright orange precipitate of the leuco ester, which is filtered, washed with 10% sodium carbonate solution, and dried.

Example 7

A solution of 103 parts of propyldimethylhydroxylamine in 550 parts of chlorobenzene is treated gradually at temperatures below 20°, with 58 parts of chlorosulfonic acid. To the resulting clear solution is added 46 parts of 6,6'-diethoxythioindigo, followed by 16 parts of zinc dust. Reaction is continued until substantially complete. The orange slurry is added to 160 parts of sodium carbonate in 3000 parts of water, and then freed of solvent by distillation in vacuo. The residue is clarified by filtration, and salted with sodium chloride to give a white precipitate of the indigosol, which is filtered and washed. It dissolves readily in water and regenerates the dyestuff on treatment with nitrous acid.

Example 8

A solution of 350 parts of chlorobenzene containing 103 parts of propyldimethylhydroxylamine is cooled to 15° C. and gradually treated with 58 parts of chlorosulfonic acid. The resulting clear solution is gradually treated under a nitrogen atmosphere with a solution of 26 parts of anthrahydroquinone in 330 parts of chlorobenzene, and heated until the reaction is substantially complete. The reaction mixture is then added to 170 parts of sodium carbonate in 2000 parts of water, and freed of solvent by distillation at reduced pressure. The residue contains, in solution, the leuco sulfuric ester of anthraquinone, which is readily reoxidized to anthraquinone if desired.

Example 9

A mixture of 27 parts of indigo powder, 95 parts of 5 N sodium hydroxide solution, 120 parts of water, and 25 parts of sodium hydrosulfite are stirred at 30 to 35° C. until vatting is complete. The mixture is cooled to 10° and treated with 4.2 parts of sodium carbonate followed by 62 parts of the sulfur trioxide compound of trimethylhydroxylamine. The reaction, which is carried out under a nitrogen atmosphere, is completed at 10° C., with the addition of a further 20 parts of 5 N sodium hydroxide. The liberated trimethylhydroxylamine is evolved from the alkaline solution, and may be absorbed in hydrochloric acid. This process is completed by gradual warming to 25° and finally to 60° C. Thus is obtained a solution of the leuco sulfuric ester of indigo, which can be salted out in the ordinary way.

Example 10

Indigo (27 parts) is vatted as described above, treated with 70 parts of sodium carbonate, cooled to 15°, and treated with 14 parts of the sulfur trioxide compound of propyldimethylhydroxylamine. After being stirred until reaction is substantially complete, the mixture is treated with 250 parts of 5 N sodium hydroxide and distilled to remove the free propyldimethylhydroxylamine. The residue is diluted and filtered, to give a solution of the indigosol.

I claim:
1. The sulfur trioxide addition product of an O,N,N-tri(lower alkyl)-hydroxylamine.
2. A sulfur trioxide compound of O,N,N-trimethylhydroxylamine.
3. A sulfur trioxide compound of O-n-butyl-N,N-dimethylhydroxylamine.
4. A sulfur trioxide compound of O-n-propyl-N,N-dimethylhydroxylamine.

WILLIAM B. HARDY.

References Cited in the file of this patent

UNITED STATES PATENTS

| Number | Name | Date |
|---|---|---|
| 2,403,226 | Lecher | June 2, 1946 |

OTHER REFERENCES

Journal American Chemical Society, vol. 50, pp. 2742–2747 (1928).